MONOPHONIC AND STEREOPHONIC FREQUENCY-MODULATION RECEIVER

Filed June 19, 1961 2 Sheets-Sheet 1

INVENTOR
Adrian J. De Vries
BY Francis W. Crotty
ATTORNEY

March 22, 1966 A. J. DE VRIES 3,242,264

MONOPHONIC AND STEREOPHONIC FREQUENCY-MODULATION RECEIVER

Filed June 19, 1961 2 Sheets-Sheet 2

INVENTOR
Adrian J. De Vries
BY Francis W. Crotty
ATTORNEY 3,242,264
Patented Mar. 22, 1966

3,242,264

MONOPHONIC AND STEREOPHONIC FREQUENCY-MODULATION RECEIVER

Adrian J. De Vries, Elmhurst, Ill., assignor to Zenith Radio Corporation, a corporation of Delaware Filed June 19, 1961, Ser. No. 118,009
18 Claims. (Cl. 179—15)

Figures 1, 3:
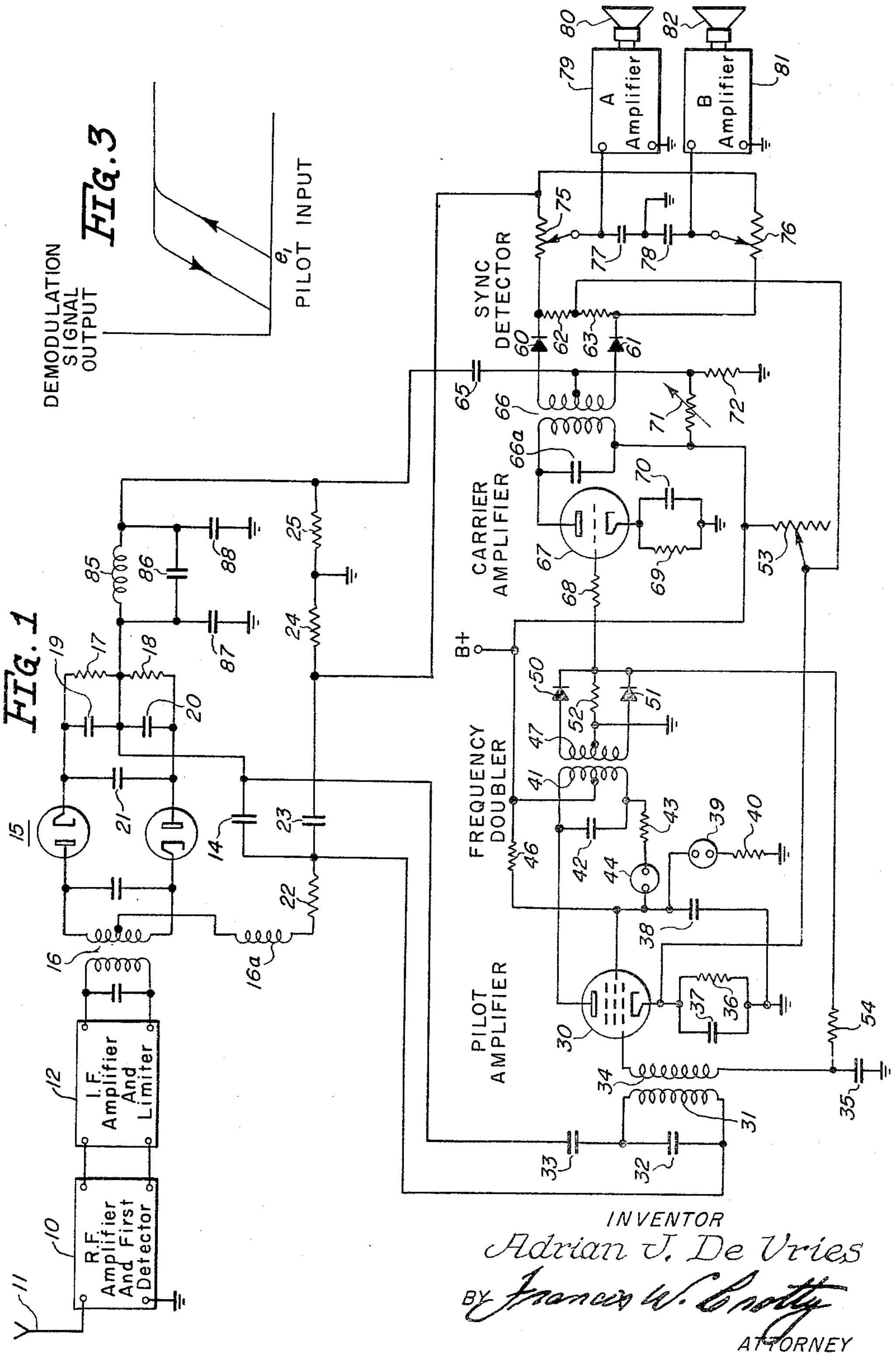

The present invention is addressed to the structure of a frequency-modulation receiver that may be employed for the reception of monophonic or stereophonic broadcast programs. The invention, in certain of its aspects, represents a continuation in part of applicant's copending application, Serial No. 22,830 filed April 18, 1960 and assigned to the same assignee as the present invention.

Both the receiver to be described here and the structure claimed in applicant's copending application lend themselves particularly well to a stereophonic frequency-modulation broadcasting system of the type described in a copending application of Robert Adler et al., Serial No. 22,926, filed April 18, 1960 and likewise assigned to the same assignee as the present application. The Adler et al. system has many attractive and desirable attributes. It is compatible in that the transmission comprises a carrier frequency-modulated by the sum of the two program signals collectively constituting a stereophonic program. A conventional FM receiver may, of course, detect this sum signal to the end that the user may completely employ the program as a monophonic reproduction.

In addition to frequency modulation of the carrier by the sum information, the Adler et al. system contemplates that the difference information be modulated on a suppressed-carrier amplitude-modulated subcarrier which, in turn, frequency-modulates the principal carrier. It may be demonstrated that this system exhibits an interleaving of the sum and difference information conveyed by the carrier, where interleaving is considered in a time domain. Per force of this characteristic, the carrier may be deviated throughout nearly the full permissible deviation by the sum and difference information which causes the system to exhibit high fidelity and good signal to noise properties. Were it not necessary to include in the radiation a pilot signal for synchronizing the detector at the receiver, full deviation could be assigned to both the sum and difference information, assuming of course that the right and left signals are themselves non correlated which is the usual experience in stereo systems. In a practical operation, perhaps 10% of the maximum possible deviation is devoted to the transmission of a pilot signal; the remainder is utilized in conveying sum and difference information.

A further most attractive benefit stemming from the Adler et al. stereophonic frequency modulation concept is the ability to employ a frequency-modulation transmitter to provide three services concurrently without adverse influence or cross talk of one upon the other. From the foregoing description, it is apparent how monophonic and stereophonic services are concurrently accommodated. At the same time, a second subcarrier signal may be modulated on the main carrier for such auxiliary services as storecasting or background music. Since, as explained in the Adler et al. application, it is only essential that the fundamental modulation products of the suppressed-carrier modulation be transmitted to convey the full stereophonic information, there is sufficient frequency spectrum remaining, even within the bandwidths assigned by the Federal Communications Commission to commercial FM transmitting stations, to accommodate storecasting without mutual interference of these several services.

An attractive receiver for utilizing the stereophonic transmission forms the subject of applicant's above-identified copending application. It features the use of a synchronous demodulator of the beam deflection tube type. The present application, which represents a continuation of that development, concerns itself with a synchronous demodulator of the diode type arranged to obtain the A and B or left and right audio signals of the stereophonic program with a minimum of circuit components.

The diode type synchronous detector has the advantage of easy convertibility from a detector to an essentially passive signal-translating stage. In view of this capability, the receiver to be described is able automatically to adjust itself, depending upon the make up of the received transmission, for monophonic or stereophonic reproduction without requiring any manipulation on the part of the user.

Still another feature of the invention is the provision of an indicating device for making clear to the user the type reproduction of the moment, whether it be monophonic or stereophonic.

Still another feature of the receiver structure is an automatic disabling, during monaural reception, of those portions of the receiver whose function is required only during stereophonic reproduction. This improves the signal-to-noise ratio of the receiver during intervals of monophonic reproduction.

Accordingly, it is an object of the invention to provide a new and improved receiver for a stereophonic frequency-modulation system.

A particular object of the invention is to provide a novel receiver especially useful for utilizing the transmission characteristic of the aforedescribed Alder et al. stereophonic frequency-modulation system.

Another principal object of the invention is the provision of a receiver capable of monophonic or stereophonic reception and self-adjusting as between these modes of operation in accordance with the character of the receiver transmission.

A subsidiary object of the invention is a receiver of the type under consideration having means for automatically indicating the type of mode in which it is instantaneously operating.

Another specific object of the invention is an improved arrangement for responding to the pilot signal characteristically included in the transmission of the Adler et al. system.

Yet another particular object of the invention is an improved and amplified synchronous detector for use with the Adler et al. stereophonic system in deriving the signals of a stereophonic program with a high degree of fidelity.

A receiver, constructed in accordance with the invention, is indeed useful in a stereophonic frequency-modulation system for utilizing a transmitted signal comprising a carrier frequency-modulated in accordance with the modulation function:

$$M(t)=K_1(A+B)+K_2(A-B)S+K_3S'$$

In that function, A and B are audio signals, S is the fundamental component of a suppressed-carrier amplitude-modulated subcarrier signal, S' is a pilot signal related in frequency to the subcarrier signal and $K_1$–$K_3$ are constants. Structurally, the receiver comprises a frequency-modulation detector responsive to the received carrier for developing a composite signal corresponding to the aforesaid modulation function. Means are provided for deriving from the detector push-pull or opposed polarity outputs of the composite signal and there are means responsive to the pilot signal for deriving a demodulation signal having a frequency S and fixed phase relation to the subcarrier. There is a synchronous diode detector including a pair of diodes and load impedances for the diodes. Means are provided for applying one polarity of the composite signal in push-push relation to the diodes and other means apply the demodulation signal in push-pull relation to the diodes. Finally, still other means apply the other polarity of the composite signal in push-push relation to the diode load impedances to effect matrixing and to develop the A audio signal in one of the load impedances and the B audio signal in the other of the load impedances.

In one aspect of the invention, the arrangement which, during stereophonic reception, demodulates the suppressed carrier conveying the difference information is converted into a simple audio frequency signal-translating stage when the character of the received transmission identifies the program as monophonic as distinguished from stereophonic.

In accordane with another aspect of the invention, indicators, such as neon lamps, are energized from the portion of the receiver which responds to the pilot signal in developing a demodulation signal corresponding to the fundamental of the subcarrier devoted to the difference information. One indicator is energized during monophonic and the other is energized during stereophonic reproduction.

A further aspect of the invention contemplates disabling of the receiver portions devoted to processing the pilot signal when, in fact, no pilot signal is received. Such a condition, of course, is established during monophonic reception.

Figure 2:
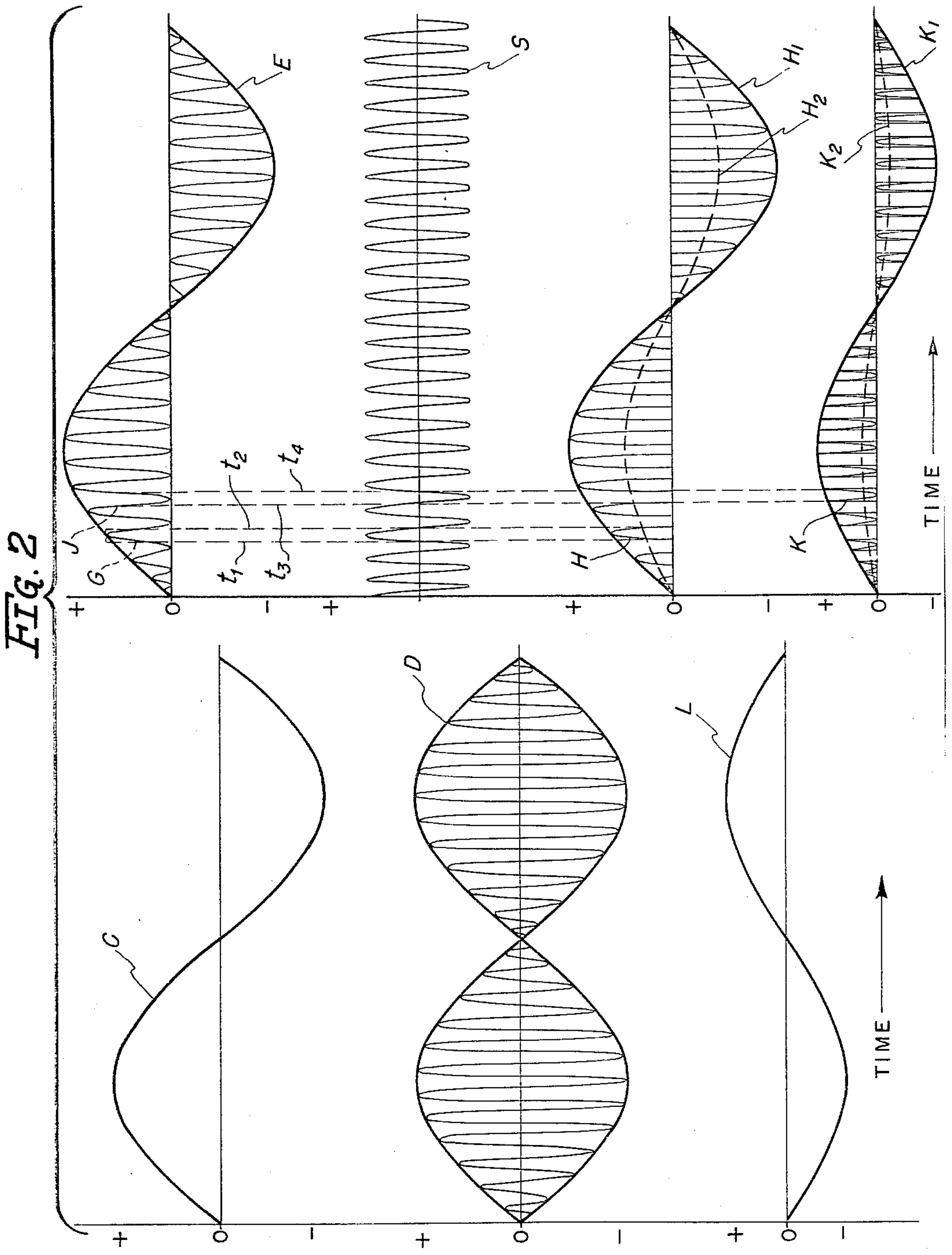

The foregoing and other objects of the invention, together with further advantages and benefits thereof, will be more clearly understood from the following description of a particular embodiment thereof taken in conjunction with the annexed drawings in the several figures of which like components are designated by similar reference characters and in which:

FIGURE 1 is a schematic representation of a receiver embodying the present invention;

FIGURE 2 comprises curves employed in explaining the operation of the synchronous diode detector included in that receiver; and FIGURE 3 represents a certain hysteresis effect exhibited by the receiver in respect of the pilot signal.

Referring now more particularly to FIGURE 1, the receiver there represented may be employed for monophonic or stereophonic frequency-modulation reception and it adjusts itself, as between these two possible modes of operation, automatically in accordance with the character of the received program signal. In presenting the structure and operation of this receiver, it is convenient first to consider its use in the reception of a stereophonic frequency-modulation broadcast of the type transmitted by the above-identified Adler et al. application.

It is explained in that application that high fidelity stereophonic reproduction may be attained, with compatibility for monophonic receivers and with accommodation for such auxiliary services as storecasting or background music, by transmitting a signal comprising a carrier frequency-modulated in accordance with the following modulation function:

$$M(t)=K_1(A+B)+K_2(A-B)S+K_3S' \quad (1)$$

where A and B are the two audio signals and the first term of the function represents their sum. The second term represents the fundamental modulation components of a suppressed-carrier amplitude-modulated subcarrier signal conveying the difference information of these audio signals, where the expression "fundamental components" means the first order modulation sidebands which attend the fundamental of the subcarrier and excludes higher order sidebands attendant the harmonics of the subcarrier signal. The fundamental of the subcarrier is designated S and S′ is a pilot signal related in frequency to the fundamental frequency of the subcarrier. The pilot may be the same frequency as the fundamental of the subcarrier or it may advantageously have a harmonic relation therewith, being half the fundamental for example. $K_1$–$K_3$ are constants; preferably $K_1$ and $K_2$ are equal and an order of magnitude larger than $K_3$ so that only a small portion, perhaps 10% of the total deviation, need be devoted to the transmission of the pilot signal. Since the subject invention concerns itself more particularly with the receiver, preferred forms of the transmitter for developing the stereophonic signal of expression (1) need not be illustrated or described. They are disclosed in detail in the aforementioned Adler et al. application and also in the copending application of Carl G. Eilers, Serial No. 23,030, filed April 18, 1960 and likewise assigned to the assignee of the present application.

The arrangement of FIGURE 1 comprises receiver circuts which, at least up to the first signal detector, are conventional. They include a radio-frequency amplifier of any desired number of stages and a heterodyning stage or first detector, both of these being represented by block 10. The input of the amplifying portion connects with a wave signal antenna 11. The output of block 10 connects with a unit 12 which will be understood to include any desired number of stages of intermediate-frequency amplification and one or more amplitude limiters. As stated these elements are of generally known construction.

It is to be pointed out, however, as explained in the Adler et al. application, that the receiver is to have characteristics which are superior to those normally found in conventional monophonic FM receivers. More specifically, it is preferred that the receiver have a high sensitivity so that the signal-to-noise ratio, particularly on stereophonic operation, will be acceptable in fringe areas. Both automatic gain control for the RF and IF stages and automatic frequency control for the heterodyne oscillator of unit 10 are desirable and may be considered to have been included in the block showing. The intermediate-frequency bandwidth of the usual monaural FM receiver is 150 to 180 kc. wide at the −6 decibel point but the bandwidth for the receiver under consideration should be wider to prevent intermodulation or cross talk of the several services that may be simultaneously accommodated in a single radiation. A bandwidth of 230 kc. is adequate if automatic gain control (not shown) maintains the level of signal through the RF and IF amplifiers at a substantially constant value in spite of variations in intensity of the received signal.

Following the IF amplifier and limiter 12 is a frequency-modulation detector responsive to the amplitude limited intermediate-frequency signal for developing a composite signal corresponding to the modulation function of the received carrier. Since effective amplitude limiting is highly desirable in the receiver, it is convenient to follow the limiter of unit 12 with a ratio detector which enhances the limiting properties of the receiver.

The ratio detector 15 is coupled to unit 12 through a doubled tuned transformer 16 which is selective to the intermediate frequency of the receiver. The detector has the usual pair of diodes connected with opposed polarities to opposite ends of the transformer secondary. Coupled on the output sides of the detectors are resistors 17, 18 and capacitors 19, 20 respectively connected in parallel to resistors 17 and 18. A large condenser 21 is in parallel with capacitors 19 and 20 and is provided to cause the detector to have an amplitude-limiting effect. Winding **16*a* introduces the quadrature voltage component to the detector and has one terminal connected to a tap of the secondary winding of the coupling transformer and its other terminal is connected to ground through a resistor 22, a blocking condenser 23 and a further resistor 24. A terminal of resistor 22 is connected through an IF bypass condenser 14 to the junction of capacitors 19 and 20 while the junction of resistors 17 and 18 is grounded through a filter and a resistor 25. The filter, which serves as an attenuator for the subcarrier frequency used for S.C.A. or background music service, comprises a series inductor 85, tuned by a capacitor 86 and shunt capacitors 87, 88. Circuit 85, 86 is tuned to the S.C.A. subcarrier, usually about 67 kilocycles. Aside from this filter and the resistive network 24, 25 with its center grounded, the ratio detector is conventional. Network 24, 25** is provided to facilitate deriving from the detector push-pull or opposed polarity outputs of the composite signal developed in the detector. The desirability of the push-pull output will be made clear hereinafter.

While the ratio detector may derive a composite signal representing the modulation function in accordance with which the received carrier has been frequency modulated, it is necessary for stereo reproduction to have a further demodulation of the subcarrier which conveys the difference information. Since that subcarrier is transmitted with no carrier component, the receiver has means responsive to the pilot signal of the received transmission for deriving a demodulation signal having a frequency and fixed phase relation to the carrier component of the suppressed-carrier amplitude-modulated subcarrier. This means includes a frequency-selective amplifier 30 of the pentode type which is transformer-coupled to the ratio detector. The primary winding 31 of the coupling transformer is tuned by capacitors 32 and 33 and one terminal of the secondary winding 34 connects to the control electrode of amplifier 30. Its other terminal is returned to ground through a capacitor 35. The cathode of amplifier 30 is returned to ground through a resistor 36 shunted by a bypass capacitor 37, the screen electrode is bypassed to ground through a capacitor 38 and is also connected through an indicator 39 and a resistor 40 to ground. The indicator may conveniently take the form of a neon lamp. The anode of the amplifier has a tuned output circuit including the primary winding 41 of a coupling transformer tuned by a capacitor 42 to the pilot frequency. The low potential end of winding 41 is connected through a resistor 43 and a further neon lamp 44 to the screen electrode of tube 30. The top of winding 41 connects to a source of anode potential +B and this same source provides screen potential through a dropping resistor 46.

The pilot signal amplifier 30 drives a frequency doubler which is coupled thereto by way of the secondary winding 47 of the coupling transformer. Opposite ends of the secondary connect to the anodes of a pair of diodes 50, 51 having their cathodes connected together and returned to the center point of winding 47 through a resistor 52. This center point may be grounded as indicated.

The cathode impedance 36, 37 of pilot amplifier 30 connects through a variable resistor 53 to potential source +B which provides an amplitude delay bias on the amplifier to establish a given quiescent sensitivity or minimum signal threshold. It is preferred that there be a regenerative feedback connection for the amplifier to increase the sensitivity in response to the reception of a pilot signal of sufficient strength to exceed its quiescent threshold. Such a regenerative feedback connection is afforded by a resistor 54 connected at one end to the cathodes of diodes 50, 51 of the frequency doubler and at its opposite end to the control electrode of amplifier 30 through transformer winding 34.

The frequency doubler, when excited by a pilot signal, supplies a demodulation signal having a frequency S and fixed phase relation to the subcarrier conveying the difference information. Sufficient control of its phase may be provided by variable tuning of one or more of the tuned circuits included in the pilot amplifier and frequency doubler chain. The receiver has means for concurrently using both this demodulation signal and the composite signal obtained from the ratio detector to derive the requisite A and B signals. This means includes a synchronous diode detector having a pair of diodes 60, 61 and load impedances 62, 63 therefor. A connection extending from the high potential terminal of load resistor 25 of the ratio detector through a coupling capacitor 65 to the center-point of the diode detector input circuit provides means for applying one polarity of the composite signal obtained at the detector in push-push relation to the anodes of diodes 60, 61. A transformer 66 provides means for applying the demodulation signal in push-pull relation to the diodes. Opposite terminals of the secondary of this transformer connect to the anodes of the diodes and the primary, which is tuned by a capacitor 66a to the fundamental of the subcarrier, constitutes the anode load of a carrier or demodulation signal amplifier comprising a triode 67. The anode of the triode returns to the source +B through the primary winding of transformer 66, the control electrode thereof is coupled through a series resistor 68 to the junction of the diode cathodes of the frequency doubler and the cathode thereof is grounded through a resistor 69 bypassed by a capacitor 70. The mid-point of transformer winding secondary 66 is coupled to the junction of a pair of resistors 71, 72 defining a voltage divider network extending between potential source +B and ground. This circuit connection, which constitutes a biasing means for the diodes of the synchronous detector serves, in a manner to be made clear hereinafter, as means effective in the absence of a stereophonic frequency-modulated subcarrier for converting the frequency detector into a simple audio frequency translating stage.

In order to achieve high fidelity reproduction, it is desirable to apply the composite signal from ratio detector 15 in push-push relation to the load impedances of the diodes serving as the synchronous detector in counterphase with the output signals developed by the diode detectors to accomplish matrixing. The means for applying this signal component to the load impedances of diodes 60, 61 is provided by a connection extending from the high potential terminal of load resistor 24 of the ratio detector to a network which may serve concurrently as a low-pass filter and a de-emphasis network. This network has a pair of voltage dividers 75, 76, with their adjustable taps returned to ground through capacitors 77 and 78, respectively. The time constant of the filter is approximately 75 microseconds so that it accomplishes de-emphasis and effectively attenuates signals above the audio range. The tap on voltage divider 75 connects to the input terminals of the A amplifier 79 which drives a sound reproducer or load speaker 80. In like fashion the tap on voltage divider 76 connects to the input of a B amplifier 81 which drives a speaker 82. Of course, it is preferred that speakers 80 and 82 have such space location relative to one another that in the area served by them there is established a pattern of audio as required for stereophonic reproduction.

In explaining the operation of the receiver, it is appropriate to consider initially the circuit conditions which prevail in the absence of received signals. The amplitude delay bias on pilot signal amplifier 30 biases that tube to cut-off and since there is no output from amplifier 30, there is no input to the frequency doubler which is also in an inoperative state. The positive potential applied to the anodes of detector diodes 60, 61 from resistive network 71, 72 causes the diodes to be conductive. If now the receiver is tuned to a stereophonic broadcast a radiated carrier, frequency-modulated in accordance with the modulation function of expression (1), is selected by the radio-frequency amplifier of unit 10 and is converted to the intermediate frequency of the receiver. After amplification and amplitude limiting in unit 12, the amplitude-limited intermediate-frequency signal is delivered to ratio detector 15. In this detector, the frequency-modulated carrier is demodulated in the usual way and develops a composite signal which corresponds to and represents the modulation function of expression (1). Opposed polarities of this composite signal are available at the high potential terminals of resistors 24 and 25 of the ratio detector.

The coupling afforded by transformer 31, 34 selects the pilot signal, the third term of the modulation function of expression (1), for application to amplifier 30. Assuming that the received signal has sufficient strength to overcome the quiescent amplitude threshold of amplifier 30, the pilot signal is amplified and delivered through transformer 41, 47 to the frequency doubler. The frequency doubler may be likened to a full wave rectifier operating on the pilot signal which is a sinusoidal signal at half the fundamental frequency of the subcarrier conveying the difference information. The high potential terminal of load resistor 52 of the frequency doubler develops a D.C. component of positive polarity and substantial value which is fed back to regenerate pilot signal amplifier 30 and increase its sensitivity. The regeneration increases space current flow of amplifier 30 as a result of which its cathode potential increases substantially in a positive direction.

The connection extending from the cathode of amplifier 30 to the junction of load resistors 62, 63 of diode detectors 60, 61 applies the cathode potential of the amplifier to the cathodes of the diodes. The circuit parameters are adjusted so that in the presence of a received pilot signal, the D.C. voltage at the junction of resistors 62, 63 is approximately equal to the D.C. voltage at the junction of resistors 71, 72. As a consequence, the net potential across the diodes is zero and the diodes are now conditioned to respond to the syunchronizing and demodulation signal supplied from frequency doubler 50, 51 through amplifier 67 to coupling transformer 66. This connection applies the synchronizing signal in push-pull relation to the anodes of diodes 60, 61 of the synchronous detector. Concurrently, the composite signal of the ratio detector is applied in push-push relation to the same diodes through coupling capacitor 65. The concurrent application of the demodulating signal and the composite signal causes synchronous detection to the end that diode load 62 develops principally the A audio signal with a slight contribution of the B audio signal while diode 63 develops principally the B audio signal with a slight contribution of the A audio signal.

The signals developed in the process of synchronous detection may be most readily understood by a consideration of the illustrative curves of FIGURE 2. These curves represent the special case in which the program modulation includes A audio but no B audio. This permits a simplification of the drawings and yet affords an appreciation of the signals developed during detection.

The curve C represents the A audio for a short period of time. In other words, this represents the first term of the modulation expression (1) for the condition in which the B audio is instantaneously zero. Curve D is a representation of the second term of the modulation function under the same condition. It is the waveform of the suppressed-carrier amplitude-modulated subcarrier modulated by the signal of curve C. Curve E is the composite output of the ratio detector in the presence of the modulation of curves C and D. For convenience, the illustration neglects the pilot signal.

The synchronous demodulation signal, shown as curve S, is developed in frequency doubler 50, 51 by frequency multiplication of the pilot signal and corresponds to the fundamental frequency of the subcarrier and is in phase therewith. Actually, the demodulation signal S is very large compared with the signal of curve E but it has not been convenient to draw this signal to scale in the illustration. As applied to diodes 60, 61, the signal S keys them or turns them on in alternation. One-half cycle of the demodulation signal causes diode 60 to be conductive and the next half cycle causes diode 61 to be conductive and so forth.

This keying of the diodes causes, in effect, a sampling of the signal voltage of curve E concurrently applied to the diodes. For example, the time interval between the construction lines designated $t_1$–$t_2$ shows one sampling instant of diode 60 during which this diode translates to its load circuit the pulse H. Considering only the on times of diode 60, the detected signal applied to its load 62 is the succession of pulses defined under the solid envelope line $H_1$, again neglecting for purposes of simplification the contribution of demodulation signal S to the detector load circuit. Filtering of the high frequency components, in the filter 75, 77, produces the waveform of curve $H_2$ as the actual detector output signal. By comparison with curve C, one can see the correspondence of the curve $H_2$ to the desired A audio signal of the received transmission.

Alternate half cycles of the demodulation signal cause diode 61 to be conductive. One such interval is represented by the time indications $t_3$–$t_4$. The signal developed during this instant in load 63 of diode 61 is represented by the pulse K. The series of conductive intervals of diode 61 cause a succession of such pulses to be developed as indicated by the solid construction outline $K_1$. Subjecting this signal to low-pass filter 76, 78 derives a signal having a waveform $K_2$ as the detected signal from diode 61. It is apparent from inspection that curve $K_2$ is essentially the same waveform as curve $H_2$ but of reduced amplitude.

The premise of the curves of FIGURE 2 is a condition in which only A audio information is instantaneously being received which, if the detection were perfect, would result in an output from one diode, say diode 60, alone. The output represented by curve $K_2$ shows the contribution of the A audio information into the circuit of detector 61 which is intended to develop only B audio information. The desired result of clean separation of the A and B audio signals is obtained by matrixing in the network 75–78 associated with the diode load impedances. In this network, the composite signal from ratio detector 15, opposite in polarity to the signal as applied to the input of the synchronous detector as indicated by curve L, is matrixed with the detector output signals. Adjustment of the intensity of the counterphase signal delivered to the matrix permits almost complete cancellation of the signal represented by curve $K_2$ leaving as the final output of the detector for the assumed conditions the signal shown in curve $H_2$ but reduced in amplitude due to the influence of the counterphase signal of curve L. The signal of curve $H_2$ is supplied from potentiometer 75 to A amplifier 79 so that only reproduction from the A speaker 80 is obtained.

In the more general case, separated A and B audio signals are developed in the matrix network associated with diodes 60, 61 and are supplied to amplifiers 79, 81 respectively to drive speakers 80 and 81.

The matrix network 75–78, in addition to providing the function of a low-pass filter for removing super-audible components from the detector output, may simultaneously perform the desired function of de-emphasis. It will be appreciated that conventional practice of frequency-modulation transmission features pre-emphasis of the high frequency components in the transmitter to attain a signal-to-noise advantage and a correlated de-emphasis is resorted to in the receiver to restore the proper weighting of all of the frequency components constituting the audio program signal.

In explaining the operation of the receiver in the reproduction of a stereophonic broadcast, reference has been made to the selection of the pilot signal from ratio detector 15, its amplification by amplifier 30 and its frequency multiplication in frequency doubler 50, 51. The curve of FIGURE 3 is a plot of pilot signal input versus demodulation signal output; it exhibits a hysteresis effect in that the minimum threshold value during the quiescent operation of the receiver is shown in $e_1$. A received stereophonic transmission in which the pilot signal exceeds this threshold causes translation through amplifier 30 which is otherwise biased to cut-off by the amplitude delay bias on its cathode. The resulting energization of the frequency doubler and the regenerative feedback through resistor 54 build up the demodulation signal amplitude as shown in the portion of the characteristic of FIGURE 3 with the arrowhead extending generally upwardly. The regeneration, in effect, increases the sensitivity of pilot amplifier 30 and permits it to hold on and maintain energization of the frequency doubler in the face of amplitude changes of the pilot signal. Its response to decreasing values of the pilot signal input, once regeneration has been permitted to assert its influence, is shown by the portion of the curve with the downwardly extending arrow. This is a feature of the demodulation signal supply circuit of particular interest for fringe areas.

Reference has been made to the presence of indicator lamps 39 and 44. Lamp 39 has a sufficient voltage across its electrodes to be excited during operating intervals in which amplifier 30 is biased to cut-off, that is to say, during operating intervals in which the receiver is not reproducing a stereophonic program. Upon receipt of a pilot signal exceeding the minimum threshold level $e_1$, amplifier 30 is rendered conductive and the voltage of its screen electrode decreases. The circuit parameters are selected so that the decrease in screen voltage, upon receipt of such a pilot signal, causes the potential applied to indicator 39 to be reduced below the level required for energization. Accordingly, this lamp is illuminated during nonstereophonic reproduction and is extinguished during intervals of stereophonic reproduction.

Lamp 44, on the other hand, has one electrode connected through resistor 43 and transformer winding 41 to the B supply and another electrode connected to the screen of tube 30. During operating intervals in which amplifier 30 is cut-off, there is insufficient voltage across the electrodes to excite this lamp but when a pilot signal exceeding the minimum threshold level is received, tube 30 is conductive and the change in its operating potential results in a sufficient voltage across lamp 44 to cause its excitation. In short, it functions in converse fashion to lamp 39 being off during non stereophonic operation and being illuminated during stereophonic reproduction.

Particular consideration has been given thus far to the operation of the receiver of FIGURE 1 as a stereophonic instrument. This is one of two possible operating modes of which the receiver is capable. In its other operating mode, the receiver accomplishes monophonic or monaural reproduction of a received frequency-modulated signal. It adopts one or the other of these operating modes in accordance with the character of the received transmission. Its operation in this respect is as follows.

The forward bias applied to diodes 60, 61 of the synchronous detector from voltage divider 71, 72 tends to cause the diodes to have the operative effect of resistors when they are maintained continuously conductive by this bias, and their demodulating function is interrupted. A signal applied to the diodes through coupling capacitor 65 is translated through the diodes and matrix network associated therewith in the usual fashion of a passive network. The only change experienced by the signal from the ratio detector in traveling this network is the filtering and deemphasis resulting from the frequency characteristics of components 75–78. In other words, the presence of the forward bias on the diodes, if permitted full play, converts the synchronous detector into an audio frequency translating stage for translating to amplifiers 79 and 81 the audio frequency components of the detected signal supplied from ratio detector 15. In this case, both speakers 80 and 82 reproduce the same monaural signal.

The effect of the forward bias applied to diodes 60, 61 can be opposed and neutralized by the potential applied to the cathodes of these diodes from load impedance 36, 37 of pilot amplifier 30 during stereophonic reproduction. For this operating condition, the diodes function in the conventional manner of diodes with no forward or reverse bias and their role is that of a diode detector.

As a consequence, during intervals of stereophonic reproduction reception of the pilot signal causes the forward bias of diodes 60, 61 to be nullified and establishes their function as detectors as required for the stereophonic mode of operation. During monaural reproduction, however, which is characterized by the absence of a pilot signal, forward bias of the diodes has full effect to convert the diodes into the equivalents of resistive components. This establishes the monophonic mode of operation of the receiver and the conversion from one mode to the other is accomplished in response to the character of the received transmission, requiring no manipulative steps on the part of the user. It is also to be pointed out that during monophonic reproduction the portion of the receiver, including pilot amplifier 30 and frequency doubler 50, 51, which functions only during stereophonic reproduction is rendered inoperative or are disabled. This prevents such components from contributing any noise to the signal reproduction. Another reason for disabling these components during monaural reproduction is to preclude any possibility of demodulating the subcarrier which may be included in the transmission for such auxiliary services as storecasting.

In order to complete the specification of the receiver, values of the significant circuit components are recited below although it is to be understood that this is merely for purposes of illustration and is not to be construed as a limitation upon the structure.

| | |
|---|---|
| Resistors: | |
| **17** and **18** | 6,800 ohms. |
| **22** | 100 ohms. |
| **24** | 5,000 ohms. |
| **25** | 15,000 ohms. |
| **36** | 1,800 ohms. |
| **40, 43, 52, 53, 62** and **63** | 100,000 ohms. |
| **46** | 82,000 ohms. |
| **54** | 1 megohm. |
| **68** | 48,000 ohms. |
| **69** | 8,200 ohms. |
| **71** | 180,000 ohms. |
| **72** | 27,000 ohms. |
| **75** and **76** | 3 megohms. |
| Capacitors: | |
| **19, 20, 14** | 330 micro microfarads. |
| **21** | 10 microfarads. |
| **23, 65** | 1 microfarad. |
| **37** and **38** | 1/10 microfarad. |
| **33** | 120 micro microfarads. |
| **32** | 470 micro microfarads. |
| **35** | .01 microfarad. |
| **66**_a_ | 680 micro microfarads. |
| **70** | .1 microfarad. |
| **77** and **78** | 86 micro microfarads. |
| **86** | 150 micro microfarads. |
| **87** | 100 micro microfarads. |
| **88** | 180 micro microfarads. |
| Amplifiers **30** and **67** | ½ type 6AU8. |
| Diodes **50, 51, 60** and **61** | Type 1N64. |
| Pilot signal frequency | 19 kc. |
| Subcarrier fundamental | 38 kc. |
| Carrier deviation for: | |
| $(A+B)$ signal | $\approx$70 kc. per second. |
| $(A-B)S$ signal | $\approx$70 kc. per second. |
| Pilot signal | $\approx$6 kc. per second. |
| Potential source +B | 100 volts. |

While a particular embodiment of the present invention has been shown and described, it will be apparent that changes and modifications may be made without departing from the invention in its broader aspects, and, therefore, the aim in the appended claims is to cover all such changes and modifications as fall within the true spirit and scope of the invention.

I claim:

1. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S′ is a pilot signal related in frequency to said subcarrier signal, and $K_1$–$K_3$ are constants, said receiver comprising: a frequency modulation detector responsive to said received carrier for developing a composite signal corresponding to said modulation function; means for deriving from said detector push-pull outputs of said composite signal; means responsive to said pilot signal for deriving a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and means for applying the other polarity of said composite signal in push-push relation to said diode load impedances to effect matrixing and develop said A audio signal in one of said load impendances and said B audio signal in the other of said load impedances.

2. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S′ is a pilot signal related in frequency to said subcarrier signal, and $K_1$–$K_3$ are constants, said receiver comprising: a frequency modulation detector responsive to said received carrier for developing a composite signal corresponding to said modulation function, said detector having a balanced load circuit for providing push-pull outputs of said composite signal; means responsive to said pilot signal for deriving a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and means for applying the other polarity of said composite signal in push-push relation to said diode load impedances to effect matrixing and develop said A audio signal in one of said load impedances and said B audio signal in the other of said load impedances.

3. A receiver for a sterephonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S′ is a pilot signal related in frequency to said subcarrier signal, and $K_1$–$K_3$ are constants, said receiver comprising: receiver circuits including an amplitude limiter for receiving said carrier and for effecting amplitude limiting thereof; a ratio detector coupled to said receiver circuits and responsive to the amplitude-limited carrier signal for developing a composite signal corresponding to said modulation function, said detector having a balanced load circuit for providing push-pull outputs of said composite signal; means responsive to said pilot signal for deriving a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and means for applying the other polarity of said composite signal in push-push relation to said diode load impedances to effect matrixing and develop said A audio signal in one of said load impedances and said B audio signal in the other of said load impedances.

4. A receiver for a stereophonic broadcasting system for utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier modulated subcarrier signal having an angular frequency $\omega_{sc}$, S′ is a pilot signal having a frequency half that of said subcarrier signal, and $K_1$–$K_3$ are constants, said receiver comprising: a detector responsive to said received carrier for developing a composite signal corresponding to said modulation function; means for deriving said pilot signal from said detector including a frequency selective amplifier tuned to said pilot signal; a frequency doubler coupled to said amplifier for developing a demodulation signal having a frequency S and fixed phase relation to said subcarrier; a regenerative feedback connection extending from said frequency doubler to said amplifier; and means for concurrently using said composite signal and said demodulation signal to derive said A and B audio signals.

5. A receiver for a stereophonic broadcasting system for utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier modulated subcarrier signal having an angular frequency $\omega_{sc}$, S′ is a pilot signal having a frequency half that of said subcarrier signal, and $K_1$–$K_3$ are constants, said receiver comprising: a detector responsive to said received carrier for developing a composite signal corresponding to said modulation function; means for deriving said pilot signal from said detector including a frequency selective amplifier tuned to said pilot signal and having an amplitude delay bias establishing a quiescent sensitivity; a frequency doubler coupled to said amplifier for developing a demodulation signal having a frequency S and fixed phase relation to said subcarrier; a regenerative feedback connection extending from said frequency doubler to said amplifier for increasing the sensitivity of said amplifier in response to a pilot signal having a level exceeding said quiescent sensitivity; and means for concurrently utilizing said composite signal and said demodulation signal to derive said A and B signals.

6. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S′ is a pilot signal related to frequency to said subcarrier signal, and $K_1$–$K_3$ are constants, said receiver comprising: a frequency modulation detector responsive to said received carrier for developing a composite signal corresponding to said modulation function; means for deriving from said detector push-pull outputs of said composite signal; means responsive to said pilot signal for deriving a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and a low-pass filter network, having an upper frequency limit below the frequency of said pilot signal, connected between the other polarity output of said push-pull signal deriving means and said diode load impedances, for applying substantially only said $(A+B)$ portion of said composite signal in push-push relation to said diode load impedances to effect matrixing and develop said A audio signal in one of said load impedances and said B audio signal in the other of said load impedances.

7. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal related in frequency to said subcarrier signal, and $K_1$–$K_3$ are constants, said receiver comprising: a frequency modulation detector responsive to said received carrier for developing a composite signal corresponding to said modulation function; means for deriving from said detector push-pull outputs of said composite signal; means responsive to said pilot signal for deriving a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and a low-pass filter and de-emphasis network, having an upper frequency limit below the frequency of said pilot signal, connected between the other polarity output of said push-pull signal deriving means and said diode load impedances for applying substantially only said $(A+B)$ portion of said composite signal in push-push relation to said diode load impedances to effect matrixing and develop said A audio signal in one of said load impedances and said B audio signal in the other of said load impedances.

8. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal related in frequency to said subcarrier signal, and $K_1$–$K_3$ are constants, said receiver comprising: a frequency modulation detector responsive to said received carrier for developing a composite signal corresponding to said modulation function; means responsive to said pilot signal for deriving a demodulation signal having a frequency S and fixed phase relation to said subcarrier; means for concurrently utilizing said composite signal and said demodulation signal to demodulate the suppressed-carrier amplitude-modulated component of said composite signal and to derive separated A and B audio signals, said last-named means including a diode synchronous detector having a pair of diodes and individual load impedances for said diodes; means for normally biasing said diodes to a conductive condition to prevent signal detection by said diodes; means responsive to the development of said demodulation signal for deriving a unidirectional control potential; and means for applying said unidirectional control potential to said diodes to effectively cancel said normal bias and condition said diodes to demodulate said modulated subcarrier component.

9. A receiver for a stereophonic broadcasting system for utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier modulated subcarrier signal having an angular frequency $\omega_{sc}$, S' is a pilot signal related in frequency to said subcarrier signal, and $K_1$–$K_3$ are constants, said receiver comprising: a detector responsive to said received carrier for developing a composite signal corresponding to said modulation function; means, defining a synchronizing channel having a predetermined quiescent sensitivity, for utilizing said pilot signal to develop a demodulation signal having a frequency S and a fixed phase relation to said subcarrier; means, responsive to receipt of a pilot signal having a level exceeding said quiescent sensitivity, for increasing the sensitvity of said synchronizing channel; and means for concurrently using said composite signal and said demodulation signal to derive said A and B audio signals.

10. A receiver for a stereophonic frequency-modulation system for utilizing a transmitted signal comprising a carrier frequency-modulated in accordance with the modulation function $$M(t)=K_1(A+B)+K_2(A-B)\cos\omega_{sc}t$$

where A and B are audio signals, $(A-B)\cos\omega_{sc}t$ defines the fundamental component of a suppressed-carrier amplitude-modulated subcarrier signal having an angular frequency $\omega_{sc}$, and $K_1$–$K_2$ are constants, said receiver comprising: a frequency modulation detector responsive to said received carrier for developing a composite signal corresponding to said modulation function; means for deriving from said detector push-pull outputs of said composite signal; means for supplying a demodulation signal having a frequency S and fixed phase relation to said subcarrier; a synchronous diode detector having a pair of diodes and individual load impedances for said diodes; means for applying one polarity of said composite signal in push-push relation to said diodes; means for applying said demodulation signal in push-pull relation to said diodes; and means for applying the other polarity of said composite signal in push-push relation to said diode load impedances to effect matrixing and develop said A audio signal in one of said load impedances and said B audio signal in the other of said load impedances.

11. In a stereophonic frequency modulation system for using a carrier signal frequency modulated by stereophonic information represented by the modulation function $$M(t)=K_1(A+B)+K_2(A-B)S$$

where A and B are audio signals, S is an amplitude-modulated subcarrier signal, and $K_1$ and $K_2$ are constants, a detector for deriving separated A and B audio signals comprising: a pair of diode detectors; an input circuit and an output circuit connecting said diodes in parallel; means for applying a demodulation signal, corresponding in frequency and phase to the carrier component of said subcarrier signal, to said diodes in push-pull relation; means for applying a pair of counterphased signals, individually representing said modulation function, to said diodes, one signal of said pair being applied through said input to said diodes in push-push relation and the other being applied in push-push relation but through said output; and means for deriving separated A and B audio signals from said output circuit for reproduction.

12. A receiver for a stereophonic broadcasting system utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal having a frequency one-half that of said subcarrier signal, and $K_1$–$K_3$ are constants, said receiver comprising: a frequency modulation detector responsive to said received carrier for developing a composite signal corresponding to said modulation function; means including a first selectively tuned amplifier stage having a predetermined low quiescent sensitivity coupled to the output of said frequency modulation detector for separating said pilot signal from said composite signal and developing an amplified pilot signal; a rectifier stage including a pair of diodes transformer-coupled to said first amplifier for full-wave rectifying said pilot signal; a second selectively tuned amplifier stage coupled to said rectifier stage and responsive to the second harmonic component of said rectified pilot signal frequency to derive a demodulation signal having a frequency equal to that of said subcarrier and a fixed phase relation therewith; and a regenerative feedback network including a resistor coupled between said rectifier stage and said first tuned amplifier for applying the D.C. portion of said rectified pilot signal to said first amplifier to increase the sensitivity of said first amplifier in response to a pilot signal having a level exceeding said predetermined low quiescent sensitivity; and means including a synchronous detector for concurrently utilizing said composite signal and said demodulation signal to derive separated A and B audio signals.

13. A receiver for a stereophonic broadcasting system utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal having a frequency one-half that of said subcarrier signal, and $K_1$–$K_3$ are constants, said receiver comprising: a frequency modulation detector responsive to said received carrier for developing a composite signal corresponding to said modulation function; demodulation signal developing means including a frequency selective amplifier having at least one electrode which is normally maintained at a first predetermined operating potential but which potential is altered to a second, different value in the presence of said stereo pilot signal; an indicator lamp, having a pair of terminals one of which is coupled to said one electrode, only responsive to a potential difference between said terminals exceeding a predetermined threshold value; and biasing means coupled to the other of said terminals of said indicator lamp for establishing a potential difference across said lamp less than said threshold value when said electrode is at said first, predetermined operating potential, but exceeding said threshold value when said electrode is altered to said second value to provide a visual indication of the reception of said stereophonic signal.

14. A receiver for a stereophonic broadcasting system utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal having a frequency one-half that of said subcarrier signal, and $K_1$–$K_3$ are constants, said receiver comprising: a frequency modulation detector responsive to said received carrier for developing a composite signal corresponding to said modulation function; demodulation signal developing means including a first frequency selective amplifier for amplifying and separating said pilot signal from said composite signal, a pair of diodes transformer coupled to said first amplifier for rectifying said pilot signal, and a second frequency selective amplifier coupled to said diodes and tuned to the second harmonic of said pilot signal for developing a demodulation signal from said rectified pilot signal having a frequency equal to that of said subcarrier and a fixed phase relation therewith, at least one of said amplifiers having at least one electrode which is normally maintained at a first predetermined operating potential, but which operating potential is altered to a second, different value in the presence of said stereo signal; means for concurrently utilizing said composite signal and said developed demodulation signal to derive separated A and B audio signals; an indicator lamp, having a pair of terminals one of which is coupled to said one electrode, only responsive to a potential difference between said terminals exceeding a predetermined threshold value; and biasing means coupled to the other of said terminals of said indicator lamp for establishing a potential difference across said lamp less than said threshold value when said electrode is at said first, predetermined operating potential, but exceeding said threshold value when said electrode is altered to said second value to provide a visual indication of the reception of said stereophonic signal.

15. A receiver for a stereophonic broadcasting system utilizing a transmitted signal comprising a carrier modulated in accordance with the modulation function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal having a frequency one-half that of said subcarrier signal, and $K_1$–$K_3$ are constants, said receiver comprising: a frequency modulation detector responsive to said received carrier for developing a composite signal corresponding to said modulation function; demodulation signal developing means including a first frequency selective amplifier stage for separating said pilot signal from said composite signal and for developing an amplified pilot signal, a rectifier stage including a pair of diodes transformer-coupled to said first amplifier for rectifying said amplified pilot signal, and a second frequency selective amplifier stage coupled to said diodes and tuned to the second harmonic of said pilot signal frequency for developing a demodulation signal from said rectified pilot signal having a frequency equal to that of said subcarrier and a fixed phase relation therewith; means for concurrently utilizing said composite signal and said developed demodulation signal to derive separated A and B audio signals; means coupled to one of said stages and responsive to a signal developed therein for deriving a control potential in the presence of said stereo pilot signal; and means including an indicator lamp for utilizing said control potential to provide a visual indication of stereophonic reception.

16. A receiver for a stereophonic broadcasting system utilizing a transmitted signal comprising a carrier modulated in accordance with the modulating function $$M(t)=K_1(A+B)+K_2(A-B)\cos\omega_{sc}t+K_3S'$$

where A and B are audio signals, $(A-B)\cos\omega_{sc}t$ defines the fundamental component of a suppressed-carrier amplitude-modulated subcarrier signal having an angular frequency $\omega_{sc}$, S' is a pilot signal having a frequency one-half that of said subcarrier signal, and $K_1$–$K_3$ are constants, said receiver comprising: a frequency modulation detector responsive to said received carrier for developing a composite signal corresponding to said modulation function; demodulation signal developing means including a first frequency selective amplifier stage for separating said pilot signal from said composite signal and for developing an amplified pilot signal, a rectifier stage including a pair of diodes transformer coupled to said first amplifier for rectifying said amplified pilot signal, and a second frequency selective amplifier stage coupled to said diodes and tuned to the second harmonic of said pilot signal frequency for developing a demodulation signal from said rectified pilot signal having a frequency equal to that of said subcarrier and a fixed phase relation therewith; means for concurrently utilizing said composite signal and said developed demodulation signal to derive separated A and B audio signals; means including at least one of said stages and a filter coupled thereto for developing a control potential in the presence of said stereo pilot signal; and means including an indicator lamp for utilizing said control potential to provide a visual indication of stereophonic reception.

17. A receiver for selectively utilizing a monaural frequency modulated carrier signal, or a stereophonic signal consisting of a carrier signal frequency modulated in accordance with the sum of two audio signals, a subcarrier signal which has been suppressed-carrier amplitude-modulated with the difference of said two audio signals, and a pilot signal subharmonically related to said subcarrier signal, said receiver comprising: a frequency modulation detector for deriving an output signal representing the frequency modulation components of the receiver carrier signal; a subcarrier signal channel comprising a normally forward biased diode detector for permitting substantially undistorted signal translation therethrough in the presence of said monaural signal; frequency selective amplifying means responsive to said pilot signal for deriving a demodulation signal having a frequency equal to that of said subcarrier and a fixed phase relation therewith; means for applying said demodulation signal to said diode detector; and means only responsive to the reception of said stereo signal for developing a control effect to effectively remove said forward bias to permit demodulation of said amplitude modulated subcarrier component of said stereo signal by said diode detector.

18. A receiver for selectively utilizing a monaural frequency modulated carrier signal, or a stereophonic signal consisting of a carrier signal frequency modulated in accordance with the sum of two audio signals, a subcarrier signal which has been suppressed-carrier amplitude-modulated with the difference of said two audio signals and a pilot signal subharmonically related to said subcarrier signal, said receiver comprising: a frequency modulation detector for deriving an output signal representing the frequency modulation components of the received carrier signal; means only responsive to said pilot signal for deriving a demodulation signal having a frequency equal to that of said subcarrier and a fixed phase relation therewith; output signal developing means for deriving from said frequency modulation detector opposite polarity outputs of said stereophonic signal; a synchronous diode detector having a pair of diodes and individual load impedances for said diodes; means for applying one polarity of said composite signal or said monaural signal in push-push relation to said diodes; means for applying said demodulation signal in push-pull relation to said diodes to develop in the presence of said stereophonic signal an output signal across said load impedances corresponding to the difference of said two audio signals; means for biasing said diodes to a conductive condition to permit substantially undistorted signal translation therethrough in the presence of said monaural signal; means responsive to said demodulation signal for deriving a unidirectional control potential; means utilizing said unidirectional control potential for effectively removing said forward bias to permit demodulation of said amplitude modulated subcarrier component of said stereo signal by said diode detector, and means coupled to said output signal developing means for matrixing the other polarity of said composite signal with said output signal of said synchronous diode detector to develop two separated signals corresponding to said audio signals.

References Cited by the Examiner

UNITED STATES PATENTS

| | | | |
|---|---|---|---|
| 3,009,111 | 11/1961 | Rhodes | 329—50 |
| 3,009,151 | 11/1961 | Shoaf | 179—15 |
| 3,031,529 | 4/1962 | Colodny | 179—15 |
| 3,087,994 | 4/1963 | Schutte | 179—15 |
| 3,105,117 | 9/1963 | Frank | 179—15 |
| 3,117,186 | 1/1964 | Burden et al. | 179—15 |
| 3,122,610 | 2/1964 | Csicsatka | 179—15 |

FOREIGN PATENTS

| | | |
|---|---|---|
| 1,084,328 | 6/1960 | Germany. |
| 1,090,279 | 10/1960 | Germany. |

OTHER REFERENCES

"A System of Stereophonic Broadcasting," Electronic Engineering, April 1960 (pages 238–239 relied on).

Browne: British Communications and Electronics, April 1960, pages 204 and 205.

DAVID G. REDINBAUGH, *Primary Examiner.*

ROBERT H. ROSE, *Examiner.*